Feb. 8, 1966  N. HABER ETAL  3,233,837
GRINDER-BLENDERS
Filed May 13, 1963  2 Sheets-Sheet 1
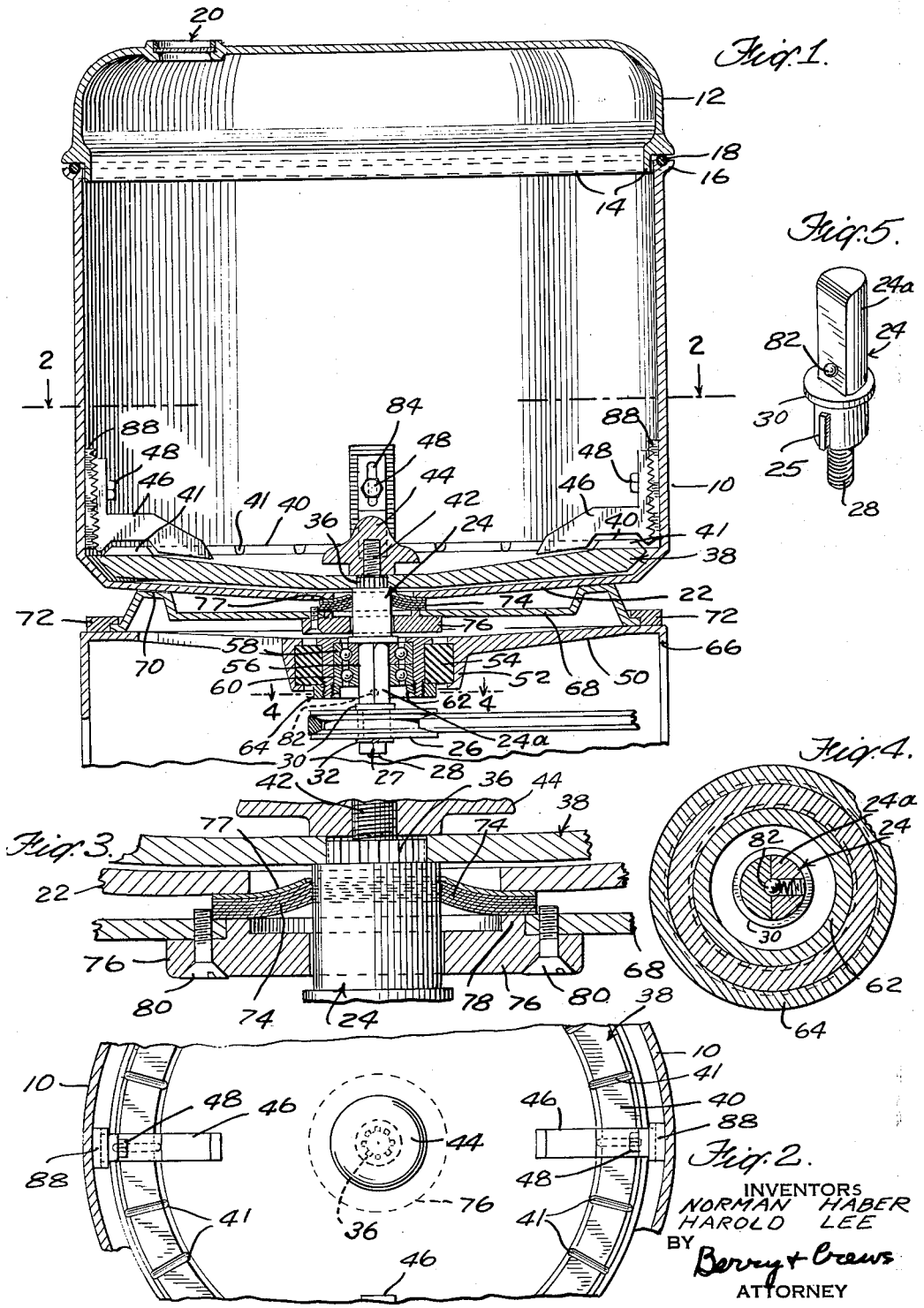
INVENTORS
NORMAN HABER
HAROLD LEE
BY
Berry + Crews
ATTORNEY Feb. 8, 1966    N. HABER ETAL    3,233,837
GRINDER-BLENDERS
Filed May 13, 1963    2 Sheets-Sheet 2
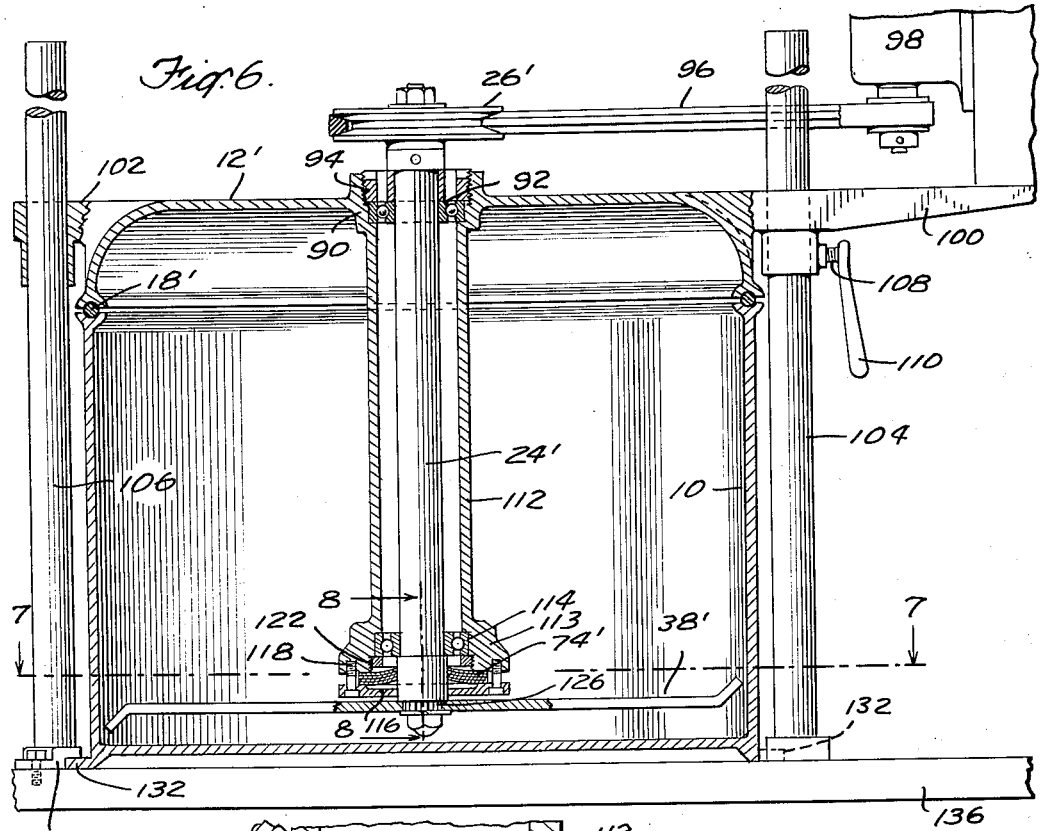
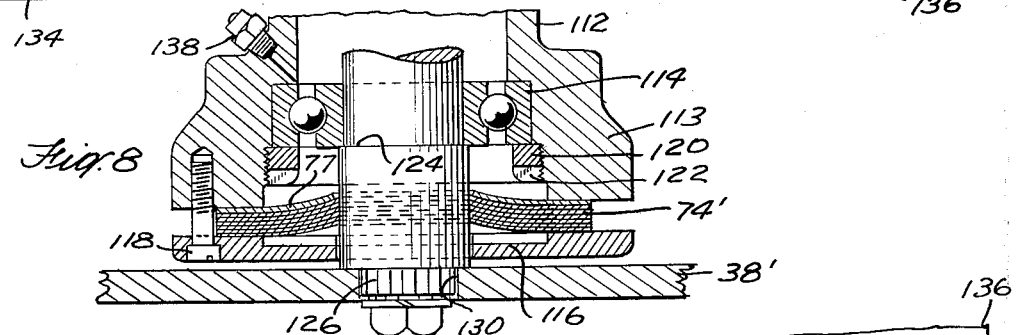
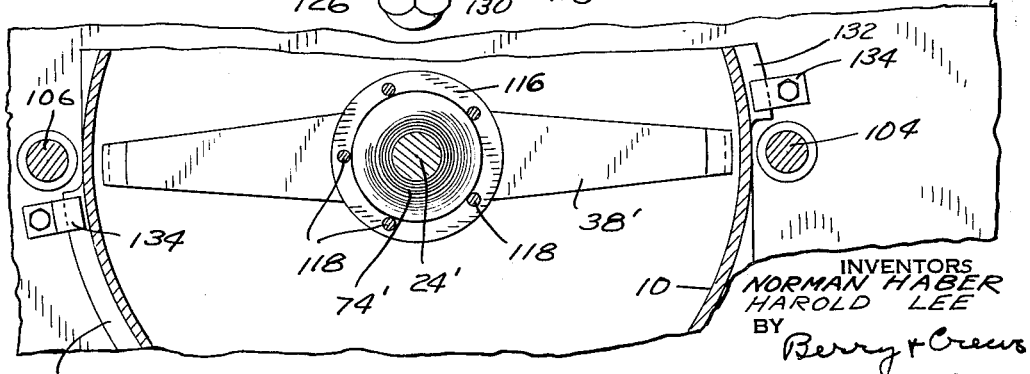
INVENTORS
NORMAN HABER
HAROLD LEE
BY Berry + Crews
ATTORNEY

United States Patent Office 3,233,837
Patented Feb. 8, 1966

3,233,837
GRINDER-BLENDERS
Norman Haber, Brooklyn, N.Y., and Harold Lee, Union, N.J., assignors to Hi-Speed Blending and Mixing Corporation, Hillside, N.J., a corporation of New Jersey
Filed May 13, 1963, Ser. No. 279,761
1 Claim. (Cl. 241—199)

Our present invention relates to grinder-blenders or the like. More particularly our invention is to be considered an improvement on the device of Patent 3,089,652, issued May 14, 1963, on an application filed November 10, 1959, by one of us, Norman Haber.

In grinder-blenders of this type, the high velocities attained by the rotor require that the seal between the rotor shaft and the exterior be of high efficiency, capable of withstanding high velocity of rubbing of one surface upon another, without overheating and resultant deterioration and ultimate leakage. It is therefore a principal object of our invention to provide an improved seal around the rotor shaft between the driving means therefor, and the rotor.

Other objects will be apparent as the description proceeds, and the novel features will be pointed out in the appended claim.

In the accompanying drawings,

FIGURE 1 is a view in vertical section of an illustrative embodiment of our improved device;

FIGURE 2 is a view taken on line 2—2 of FIGURE 1 with certain parts broken away;

FIGURE 3 is an enlarged view in vertical section of the seal and associated parts;

FIGURE 4 is a view taken on line 4—4 of FIGURE 1;

FIGURE 5 shows one element of a composite shaft;

FIGURE 6 is a view in vertical section of a further embodiment in which the rotor and drive are vertically shiftable to be clear of the bowl;

FIGURE 7 is a view on line 7—7 of FIGURE 6 with portions broken away; and

FIGURE 8 is an enlarged vertical sectional view taken on line 8—8 of FIGURE 6.

Referring now in detail to FIGURE 1, 10 denotes the bowl of the improved grinder-blender which is provided with a cover 12 arranged to have a snug fit with the bowl 10 by means of an inner flange 14. The wall of bowl 10 is provided with an expanded top having a grooved channel 16 containing a gasket 18. A glass-equipped peephole or window 20 is provided in the cover 12.

The bowl 10 has a bottom 22 which is provided with a central aperture to accommodate a drive shaft generally denoted as 24. At its lower end the shaft is provided with a pulley 26 held thereon by nut 27 screwed to a threaded end 28, FIGURE 5. The shaft 24 is splined at 25 (FIGURE 5) to fixedly secure the pulley 26 thereto, said pulley being held against a shoulder 30 by a lock washer 32 disposed between the nut 27 and the pulley 26, and locking the nut on the threaded end of the shaft 24.

Shaft 24 is preferably formed of two separable elements of which the lower, 24a, is shown as FIGURE 5. The upper portion of said shaft is shown in FIGURES 1 and 3, each portion having interfitting plane surfaces which include the vertical axis, the upper portion being seen in FIGURES 1 and 3. (The cleavage plane of the matching parts may be other than as shown.) The composite shaft 24 has its upper terminal end constituted of a splined portion 36, FIGURE 1, to receive a correspondingly apertured rotor 38 which is seen in FIGURES 1 and 2, and is formed preferably slightly dish-shaped concave upwardly, as seen in FIGURE 1, and provided at its periphery with an upwardly protruding rim 40 provided with radial slots 41, FIGURES 1 and 2.

Finally, the shaft 24 terminates in a threaded end 42 of reduced diameter to receive a wing nut 44, the purpose of which is to hold the rotor 38 tightly in place.

To enhance the beating effect of the rotor 38, a plurality of stationary, vertically disposed blades 46 are provided, the lower portion of which have a contour the same as the outer surface of the rim 40 of rotor 38, but spaced therefrom a slight distance, said blades 46 being bolted to the bowl by bolts 48.

The lower portion of shaft 24 is journaled in a bearing of special construction which comprises a mounting bracket 50 which has a cylindrical portion 52 adapted to hold a rubber ring 54 affording a resilient connection between the frame of the machine and the ball bearing assembly, as shown. The latter consists of a ring 56 containing superimposed ball bearings 58, 60, the assembly being held together by means of a spanner ring 62 threaded to ring 56, and a superimposed locking ring 64. The mounting bracket 50 for the described bearing is connected to base 66, and may either be a solid concave disk, or may be in the form of a spider, as shown in FIGURE 1. Base 66 may be connected to the bowl 10 by means of a flanged, disk-like member 68, the flanged portion of which may be brazed or cemented to the bowl, the parts being joined as shown at 70, the member 68 being joined to the base 66 by means of a flanged retaining collar 72.

The improved seal may now be described. Referring particularly to FIGURES 1 and 3, a plurality, say from 2 to 6 thin (of a thickness approximately 0.015 inch) blades or disks 74 are inserted around the shaft 24, said disks being of a tough, resilient material, as for example Thiokol, silicon rubber, plastic sold under the trademark Tygon and consisting of a polyvinylidene compound. Or other elastomers, as for example the fluor rubbers, especially those sold under the trademark Viton may likewise be used. Disks 74 are provided with an accommodating aperture of slightly less diameter than the diameter of the shaft 24, whereby such disks are under stress and are buckled so as to form an angle with the shaft less than a right angle. The top disk is preferably provided with a facing member 77, which may be of Teflon or like plastic, the aggregate being held in place between the bottom of bowl 22 and the member 68 by means of plate 76 surrounding shaft 24 and having an annular bearing portion 78 which serves to hold the disks 74 in place when screwed home by the action of screws 80 which are threaded in the member 68. In practice, excellent results have been had when the diameter of the aperture of the disks has been 0.005 inch less than the shaft diameter when the latter has been ¼ inch. If desired, the bearing portion 78 may be enlarged to extend just short of the shaft 24. However, by permitting a substantial space between the bearing portion 78 and the shaft, a slight bellows effect is had which in general, is of advantage.

The purpose of providing for a split shaft 24 is in order that the parts may be readily assembled and disassembled, it being noted that the two parts of said shaft are held together by means of a spring-pressed ball 82 in the right hand part, FIGURE 4, which is caused to enter a depression in the left hand part.

Stationary blades 46, which may vary in number as desired, may be adjusted in height by reason of the fact that the vertical portions thereof are slotted as at 84, FIGURE 1, and are retained by means of bolts 48. By way of further securing said members against accidental displacement, their edges opposite the bowl 10 are serrated, as shown, and register with similar serrated members 88 welded, or otherwise attached to the inside of bowl 10.

In FIGURE 6, rotor 38′ and driving means therefor are mounted in a manner so as to be readily removed from the bowl, thus allowing the bowl and its contents to be moved to another location. To accomplish this, the shaft 24' is mounted in the cover 12' for which purpose the cover is provided with a hollow boss 90, within which is mounted ball bearing 92, being secured therein by spanner ring 94. The upper portion of the shaft has pulley 26' connected by means of belt 96 to motor 98, which is mounted in bracket 100 at the right in FIGURE 6, such bracket being integral with the cover 12'. Said cover also has a left hand bracket 102, it being noted that the cover and the parts associated therewith are movable up-and-down on a pair of posts 104, 106, said cover being maintained in any desired position by means of set screw 108 which is operated by means of a handle 110. Between said cover and bowl 10' is a gasket 18', as in the previously described embodiment.

Shaft 24' is equipped with a housing or sleeve 112 which at its upper end is integral with boss 90. At its lower end it is integral with boss 113 which contains lower ball bearing 114. It also contains the sealing disks 74' which are altogether similar to disks 74 and are placed under compression by the action of a floating plate 116 which is screwed home by screws 118, one of which is shown, which extend into boss 113. It will be noted that the ball bearing 114 is held in place by spanner ring 120, and locking ring slotted at 122, the shaft being maintained against axial movement by reason of a shoulder 124, FIGURE 8. Finally, the shaft terminates in a splined portion 126 accommodating the rotor blade 38'.

The bottom of bowl 10' is provided with an interrupted flange 132 engaging which is a clamp 134, whereby the bowl is maintained rigid on its support 136.

Usual means will be provided for lubricating the bearings, one of which, 138, is seen in FIGURE 8.

It will be understood that various changes may be made in the details of the described embodiment without departing from the spirit of our invention, or the scope of the appended claim.

We claim:
In a high speed grinder-blender,
a rotor,
a bowl containing the rotor and adapted to hold materials including liquids to be acted upon by the rotor,
power driving means,
a shaft connecting the power driving means and the rotor, and
a seal for said shaft comprising a plurality of superimposed disks perforated for the shaft to pass therethrough, said disks being of tough resilient material and said perforations being of slightly less diameter than that of the shaft, such as to buckle said disks and cause them to assume an angle to the shaft other than a right angle,
means for holding said disks in place,
said rotor being of the hammer-type consisting of a disk having an upstanding rim which is provided with radial slots, stationary blades attached to the bowl which are disposed above said rim and cooperate therewith by having opposing surfaces of substantially the same contour.

References Cited by the Examiner
OTHER REFERENCES

| | | | |
|---|---|---|---|
| 1,593,325 | 7/1926 | Atwood | 277—233 X |
| 2,616,820 | 11/1952 | Bourgeaux | 134—184 X |
| 2,950,868 | 8/1960 | Lannert | 241—46.1 |
| 3,014,671 | 12/1961 | Thompson | 241—296 |
| 3,089,652 | 5/1963 | Haber | 241—285 X |

ROBERT C. RIORDON, *Primary Examiner.*

J. SPENCER OVERHOLSER, *Examiner.*